3,702,344
NOVEL FORMAMIDE DERIVATIVES
Walter Ost, Klaus Thomas, and Dietrich Jerchel, Ingelheim am Rhein, Germany, assignors to C. H. Boehringer Sohn, Ingelheim am Rhein, Germany
No Drawing. Filed July 15, 1970, Ser. No. 55,270
Int. Cl. C07c 103/00
U.S. Cl. 260—561 S     21 Claims

ABSTRACT OF THE DISCLOSURE

Compound of the formula

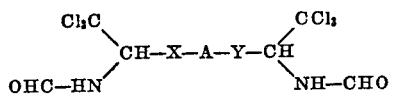

wherein X and Y are each oxygen, sulfur, —SO— or —SO$_2$—; and A is (a) straight or branched alkylene of 2 to 10 carbon atoms, whose carbon chain may be interrupted by 1 to 3 oxygen atoms, by a sulfur atom, by an —SO— group, by an —SO$_2$— group, by a cyclohexylene group or by a phenylene group, where said phenylene group may have substituents attached thereto, said substituents being selected from the group consisting of 1 to 2 chlorine or bromine atoms, $$-O-\underset{CCl_3}{CH}-NH-CHO \text{ and } -S-\underset{CCl_3}{CH}-NH-CHO$$

(b) cyclohexylene; or
(c) phenylene, which may have 1 to 4 halogen, 1 to 2 lower alkyl or 1 to 2 lower alkoxy substituents attached thereto;
the compounds are useful as biocidal agents, especially as systemic fungicidal agents against all types of phytopathogenic fungi, such as mildew, plant rust and Fusaria.

---

This invention relates to a novel class of biocidal formamide derivatives, and to a process for preparing these compounds.

More particularly, the present invention relates to compounds of the formula

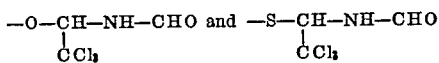

wherein X and Y are each oxygen, sulfur, —SO— or —SO$_2$—; and A is (a) straight or branched alkylene of 2 to 10 carbon atoms, whose carbon chain may be interrupted by 1 to 3 oxygen atoms, by a sulfur atom, by an —SO— group, by an —SO$_2$— group, by a cyclohexylene group or by a phenylene group, where said phenylene group may have substituents attached thereto, said substituents being selected from the group consisting of 1 to 2 chlorine or bromine atoms, $$-O-\underset{CCl_3}{CH}-NH-CHO \text{ and } -S-\underset{CCl_3}{CH}-NH-CHO$$

(b) cyclohexylene; or
(c) phenylene, which may have 1 to 4 halogen, 1 to 2 lower alkyl or 1 to 2 lower alkoxy substituents attached thereto.

The compounds embraced by Formula I above may be prepared by reacting a compound of the formula $$H-X-A-Y-H \qquad (II)$$

wherein X, Y and A have the same meanings as in Formula I, with a compound of the formula $$Cl_3C-CHZ-NH-CHO \qquad (III)$$

wherein Z is a substituent which can be readily split off as an anion, such as chlorine, bromine, alkylsulfonyl, azido, benzoyloxy, trifluoroacetyl, alkylsulfonyloxy or arylsulfonyloxy.

The reaction is advantageously carried out in the presence of an inert organic solvent medium, such as acetone, tetrahydrofuran, chloroform, ether or mixtures of two or more of these, at temperatures between about 0 to 80° C., preferably at room temperature, and advantageously in the presence of an acid acceptor, such as a tertiary amine.

If X and/or Y in Formula I are —SO— or —SO$_2$—, or if A in Formula I is alkylene whose carbon chain is interrupted by —SO— or —SO$_2$—, such compounds may also be prepared by mild oxidation of a corresponding compound of the Formula I wherein X and/or Y are sulfur or A is alkylene whose carbon chain is interrupted by a sulfur atom, for instance with hydrogen peroxide/acetic acid at room temperature.

Most of the compounds according to the present invention are amorphous substances or viscous, colorless to yellowish liquids; they are readily soluble in most organic solvents except aliphatic hydrocarbons, but very sparsely soluble in water.

The following examples further illustrate the present invention and will enable others skilled in the art to understand it more completely. It should be understood, however, that the invention is not limited solely to the particular examples given below.

EXAMPLE 1

Preparation of 1,2-bis-[(1'-formylamino-2,2,2-trichloro)-ethoxy]-ethane 8.2 gm. of triethylamine were added dropwise to a solution of 2.48 gm. of 1,2-ethanediol and 16.9 gm. of N-(1,2,2,2-trichloroethyl)-formamide in 100 ml. of tetrahydrofuran. Thereafter, the reaction mixture was stirred for one hour at room temperature, then the precipitated triethylamine hydrochloride was separated by vacuum filtration, and the filtrate was evaporated in vacuo. The residual syrup was stirred with warm isopropyl ether, the mixture was allowed to cool to 20° C., the isopropyl ether phase was decanted, and the solid phase was thoroughly dried in vacuo at 60° C. 9.1 gm. of a resinous-viscous, slightly yellowish product were obtained. It was identified to be the solvate of 1,2-bis-[(1'-formylamino-2',2',2'-trichloro)-ethoxy]-ethane of the formula

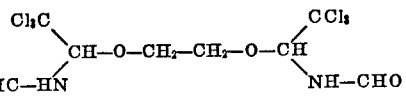

with ½ mol of tetrahydrofuran.

Analysis.—(solvate) Calculated (percent): C, 26.87; H, 3.15; N, 6.26; Cl, 47.59. Found (percent): C, 26.33; H, 3.19; N, 6.50; Cl, 47.3.

EXAMPLE 2

Preparation of 1,2-bis-[(1'-formylamino-2',2',2'-trichloro)-ethoxy]-benzene 1,2-benzenediol and N-(1,2,2,2-tetrachloro-ethyl)-formamide were reacted in tetrahydrofuran in the presence of triethylamine, as described in Example 1. The syrupy raw product was purified by twice dissolving it in isopropanol and reprecipitating it each time by addition of an equal volume of hexane. The purified product was dried in vacuo at 95° C., yielding a colorless, amorphous substance having a sintering point of 60–70° C. and a melting point of 102–104° C. It was identified to be the solvate of 1,2-bis-[(1'-formylamino-2',2',2'-trichloro)-ethoxy] - benzene of the formula

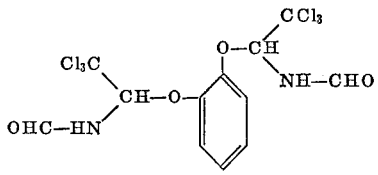

with ½ mol of tetrahydrofuran.

Analysis.—(solvate) Calculated (percent): C, 33.97; H, 2.85; N, 5.65. Found (percent): C, 33.3; H, 2.85; N, 5.98.

EXAMPLE 3

Using a procedure analogous to that described in Example 2, the solvate of 1,3-bis-[(1'-formylamino-2',2',2'-trichloro)-ethoxy]-benzene with ½ mol tetrahydrofuran, a virtually colorless, amorphous powder having a sintering point of 60–70° C. and a melting point of 105–110° C., was prepared from 1,3-benzenediol and N-(1,2,2,2,-tetrachloro-ethyl)-formamide.

Analysis.—(solvate) Calculated (percent): C, 33.97; H, 2.85; N, 5.65. Found (percent): C, 33.95; H, 2.79; N, 6.14.

EXAMPLE 4

1,2-dihydroxy-3,4,5,6-tetrachloro-benzene and N-(1,2,2,2-trichloro-ethyl)-formamide were reacted in tetrahydrofuran in the presence of triethylamine, as described in Example 1. The raw product was purified by dissolving it in benzene, washing the solution several times with water, drying it and evaporating it in vacuo. 1,2-bis-[(1'-formylamino - 2',2',2' - trichloro) - ethoxy]-3,4,5,6-tetrachloro-benzene, a reddish viscous syrupy substance of the formula

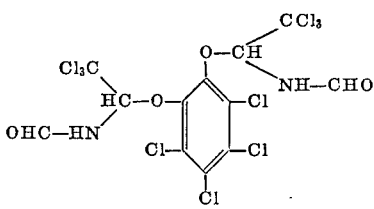

was obtained.

EXAMPLE 5

Using a procedure analogous to that described in Example 1, 1,4 - bis - [(1' - formylamino-2,'2',2'-trichloro)-ethoxy]-n-butane, a yellowish, viscous oil, of the formula

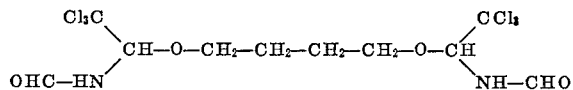

was prepared from 1,4-butanediol and N-(1,2,2,2-tetrachloroethyl)-formamide. The yield was 75% of theory.

EXAMPLE 6

Using a procedure analogous to that described in Example 1, 2,3 - bis - [(1'-formylamino-2',2',2'-trichloro)-ethoxy]-n-butane, a yellowish, viscous, non-distillable oil, of the formula

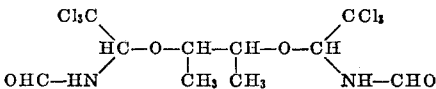

was prepared from 2,3-butanediol and N-(1,2,2,2-tetrachloroethyl)-formamide. The yield was 74% of theory.

EXAMPLE 7

Using a procedure analogous to that described in Example 1, 1,3 - bis - [(1'-formylamino-2',2',2'-trichloro)-ethoxy]-n-butane, a resinous, slightly brownish substance, of the formula

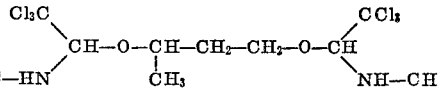

was prepared from 1,3-butanediol and N-(1,2,2,2-tetrachloroethyl)-formamide. The yield was 79% of theory.

EXAMPLE 8

Using a procedure analogous to that described in Example 1, 1,3 - bis - [(1' - formylamino-2',2',2'-trichloro)-ethoxy-propane, a viscous, light-brown oil, was prepared from 1,3-propanediol and N-(1,2,2,2-tetrachloro-ethyl)-formamide. The yield was quantitative.

EXAMPLE 9

Using a procedure analogous to that described in Example 1, 1,2 - bis - [(1'-formylamino-2',2',2'-trichloro)-ethoxy]-propane, a viscous, yellowish oil, was prepared from 1,2-propanediol and N-(1,2,2,2-tetrachloro-ethyl)-formamide. The yield was quantitative.

EXAMPLE 10

Using a procedure analogous to that described in Example 1, 2,3 - bis - [(1'-formylamino-2',2',2'-trichloro)-ethoxy]-2,3-dimethyl-butane, a highly viscous, light-brown substance, of the formula

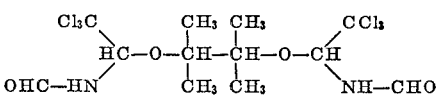

was prepared from 1,1,2,2-tetramethyl-1,2-ethanediol and N-(1,2,2,2-tetrachloro-ethyl)-formamide. The yield was quantitative.

EXAMPLE 11

1.95 gm. of 2-mercapto-ethanol and 10.5 gm. of N-(1,2,2,2-tetrachloro-ethyl)-formamide were reacted in the presence of 5 gm. of triethylamine and the reaction mixture was worked up, as described in Example 1. The raw product was extracted twice with warm hexane, dissolved in benzene, the solution was treated with activated charcoal and filtered, and the filtrate was evaporated in vacuo. 9.4 gm. of a colorless, viscous oil were obtained which was identified to be 1-[(1'-formylamino-2',2',2'-trichloro) - ethoxy]-2-[(1" - formylamino - 2",2",2" - trichloro)-ethylmercapto]-ethane of the formula

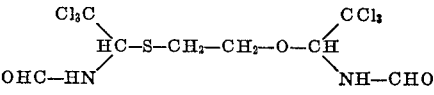

EXAMPLE 12

Using a procedure analogous to that described in Example 1, 1,2-bis-[(1'-formylamino - 2',2',2' - trichloro)-ethoxy]-1-(chloro-methyl)-ethane, a viscous, non-distillable oil, of the formula

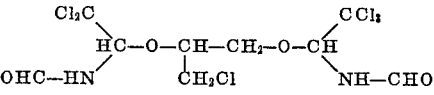

was prepared from 1-chloromethyl-1,2-ethanediol and N-(1,2,2,2-trichloro-ethyl)-formamide. The yield was 76% of theory.

EXAMPLE 13

Glycerin and 3 mol-equivalents of N-(1,2,2,2-tetrachloro-ethyl)-formamide were reacted in the presence of triethylamine and the reaction mixture was worked up, as described in Example 1. The raw product crystallized upon standing for one day at room temperature and was then recrystallized from acetonitrile, yielding 47% of theory of 1,2,3-tris-[(1'-formylamino - 2',2',2' - trichloro)-ethoxy]-propane, decomp. pt. 170° C., of the formula

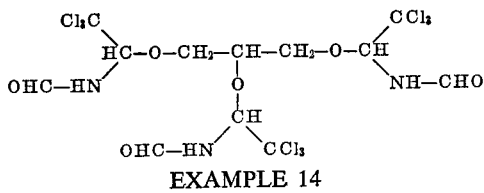

EXAMPLE 14

Using a procedure analogous to that described in Example 1, 1,4 - bis - [(1'-formylamino-2',2',2'-trichloro)-ethoxy]-cyclohexane, a light-brown syrupy substance, of the formula

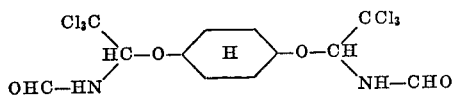

was prepared from a cis, trans-isomer mixture of 1,4-cyclohexanediol and N-(1,2,2,2-tetrachloro-ethyl)-formamide. The yield was 90% of theory.

EXAMPLE 15

Using a procedure analogous to that described in Example 1, 1,4 - bis-[(1'-formylamino - 2',2',2' - trichloro)-ethoxy]-cyclohexane, a yellowish, viscous oil, of the formula

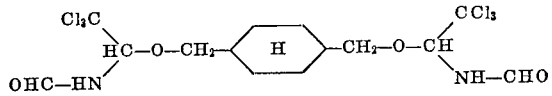

was prepared from 1,4-bis-(hydroxy-methyl)-cyclohexane and N-(1,2,2,2-tetrachloro-ethyl)-formamide. The yield was 75% of theory.

EXAMPLE 16

1-thioglycerin and 3 mol-equivalents of N-(1,2,2,2-tetrachloro-ethyl)-formamide were reacted and the reaction mixture worked up, as described in Example 1. The raw product was extracted twice with warm isopropanol and dried in vacuo, yielding an amorphous, semi-solid substance with ½ mol of solvated tetrahydrofuran, of the formula

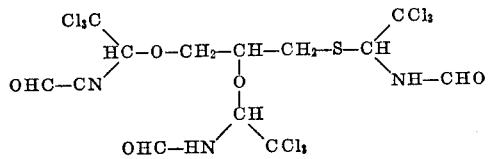

*Analysis.*—Calculated (percent): C, 25.20; H, 2.72; N, 6.30; Cl, 47.8. Found (percent): C, 24.58; H, 3.14; N, 6.60; Cl, 46.7.

EXAMPLE 17

2,2'-thiodiethanol and N-(1,2,2,2-tetrachloro-ethyl)-formamide were reacted and the reaction mixture was worked up, as described in Example 1. The raw product was dissolved in isopropanol, the solution was purified by treatment with activated charcoal, the mixture was filtered, and the filtrate was evaporated in vacuo, yielding a clear, yellowish syrupy substance which was identified to be 1,5-bis-[(1'-formylamino-2',2',2'-trichloro)ethoxy]-3-thia-n-pentane of the formula

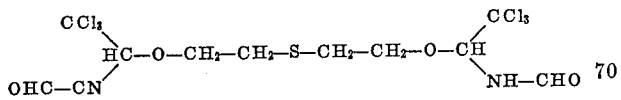

with ½ mol of solvated isopropanol.

*Analysis.*—Calculated (percent): C, 27.57; H, 3.62; N, 5.58; Cl, 42.46; S, 6.40. Found (percent): C, 26.72; H, 3.66; N, 5.64; Cl, 41.2; S, 6.5.

EXAMPLE 18

1,2-cyclohexanediol and N-(1,2,2,2-tetrachloroethyl)-formamide were reacted and the reaction mixture was worked up, as described in Example 1. The raw product was taken up in isopropyl ether, the solution was purified by treatment with activated charcoal, the mixture was filtered, and the filtrate was evaporated in vacuo, yielding 79% of theory of a clear, light-brown oil which was identified to be 1,2 - bis - [(1'-formylamino-2',2',2'-trichloro)-ethoxy]-cyclohexane (cis, trans-isomer mixture) of the formula

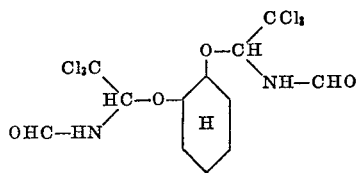

EXAMPLE 19

1,3-cyclohexanediol and N-(1,2,2,2-tetrachloro-ethyl)-formamide were reacted and the reaction mixture was worked up, as described in Example 1. The raw product was dissolved in isopropanol, the solution was purified by treatment with activated charcoal, the mixture was filtered, and the filtrate was evaporated in vacuo, yielding 71% of theory of 1,3-bis-[(1'-formylamino-2',2',2'-trichloro)-ethoxy]-cyclohexane (cis, trans-isomer mixture) with 1 mol of solvated isopropanol.

EXAMPLE 20

Hydroquinone and N-(1,2,2,2-tetrachloro-ethyl)-formamide were reacted and the reaction mixture was worked up, as described in Example 1. The syrupy raw product was made to crystallize by addition of a mixture of isopropyl ether and hexane, and the crystalline product was recrystallized from acetonitrile, yielding 1,4-bis-[(1'-formylamino-2',2',2' - trichloro) - ethoxy]-benzene, decomp. pt. 183–185° C., of the formula

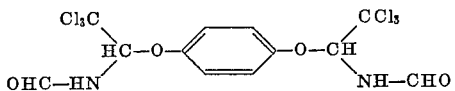

*Analysis.*—Calculated (percent): C, 31.4; H, 2.20; N, 6.1. Found (percent): C, 31.5; H, 2.56; N, 6.0.

EXAMPLE 21

1,5-pentanediol and N-(1,2,2,2 - tetrachloro-ethyl)-formamide were reacted and the reaction mixture was worked up, as described in Example 1. The raw product was extracted with isopropyl ether, the extract solution was decanted, and the residue was dried in vacuo, yielding 1,5-bis-[(1'-formylamino-2',2',2'-trichloro)-ethoxy]-n-pentane with 0.5 mole solvated isopropyl ether.

*Analysis.*—Calculated (percent): C, 33.36; H, 4.60; N, 5.55; Cl, 42.20. Found (percent): C, 33.28; H, 4.32; N, 5.95; Cl, 42.19.

EXAMPLE 22

1,2-dimercapto-ethane and N-(1,2,2,2 - tetrachloroethyl)-formamide were reacted and the reaction mixture was worked up, as described in Example 1. The solid raw product was recrystallized from isopropanol/hexane, yielding 54% of theory of 1,2-bis-[1'-formylamino-2',2',2'-trichloro)-ethylthio]-ethane, M.P. 160° C., of the formula

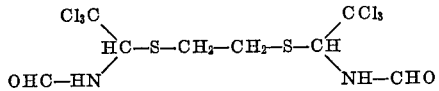

*Analysis.*—Calculated (percent): C, 21.69; H, 2.28; N, 6.32; S, 14.47. Found (percent): C, 21.68; H, 2.14; N, 6.12; S, 14.77.

EXAMPLE 23

Preparation of 1,2-bis-[(1'-formylamino-2',2',2'-trichloro)-ethylsulfoxido]-ethane 5.0 gm. of 1,2-bis-[(1'-formylamino-2',2',2'-trichloro)-ethylthio]-ethane were dissolved in 32 ml. of glacial acetic acid. While stirring the solution, 11 ml. of acetic acid anhydride and 7 ml. of 30% hydrogen peroxide were added thereto, the mixture was slowly heated to 40° C., and after commencement of the exothermic reaction the temperature of the reaction mixture was maintained at 45–50° C. by intermittent exterior cooling. After 30 minutes, the reaction mixture was cooled, and the precipitate formed thereby was collected by vacuum filtration and washed thoroughly with ethanol. 3.1 gm. of colorless crystalline 1,2-bis-[(1'-formylamino-2',2',2'-trichloro)-ethylsulfoxido]-ethane, decomp. pt. 152–153° C., of the formula $$\underset{OHC-HN}{\overset{Cl_3C}{\diagdown}}HC-OS-CH_2-CH_2-SO-C\underset{NH-CHO}{\overset{CCl_3}{\diagup}}$$

were obtained.

*Analysis.*—Calculated (percent): C, 20.23; H, 2.13; N, 5.90; S, 13.90. Found (percent): C, 20.36; H, 2.4; N, 5.80; S, 13.59.

The compounds according to the present invention, that is, those embraced by Formula I above, have useful properties. More particularly, the compounds of the instant invention exhibit very effective biocidal activities, especially systemic fungicidal activities against phytopathogenic fungi, such as mildew (*Erysiphe graminis*), plant rust fungi and Fusaria. Particularly effective are those compounds of the Formula I wherein A is alkylene of 2 to 4 carbon atoms, especially —(CH$_2$)$_2$—, —(CH$_2$)$_3$—, —(CH$_2$)$_4$— and —CH(CH$_3$)—CH$_2$—.

For use as fungicidal agents, the compounds of the present invention are incorporated as actvie ingredients into conventional agricultural fungicidal compositions, such as wettable powders, emulsion concentrates, solutions, sprays, granulates, dusting powders and the like, i.e. compositions consisting essentially of an inert liquid or solid carrier and an effective fungicidal amount of the active ingredient. By virtue of their good solubilities in organic solvents, the compounds of the present invention are particularly well adapted for the preparation of highly concentrated solutions and emulsion concentrates which are diluted to the desired concentration of active ingredient just prior to their use as fungicidal agents on plants. The active ingredient concentration range in such highly concentrated solutions or emulsion concentrates is preferably about 0.05 to 50% by weight, based on the total weight, and the concentrated compositions may be diluted to an active ingredient concentration of 0.5 to 0.0001% prior to use, although dusting powders and so-called ultra-low-volume compositions (ULV) may also have a higher active ingredient content.

The following examples illustrate a few prophylactic fungicidal compositions comprising a compound of the present invention as an active ingredient and represent the best modes contemplated of putting the invention into practical use. The parts are parts by weight unless otherwise specified.

EXAMPLE 24

Spray

The spray composition was compounded from the following ingredients:

| | Parts |
|---|---|
| End product of Example 1 | 10 |
| N-methyl-pyrrolidone | 39 |
| Triethyleneglycol | 41 |
| Condensation product octylphenol and 10 mols of ethyleneglycol (wetting agent) | 10 |

Preparation

The ingredients were intimately admixed with each other, resulting in a liquid composition which was an effective prophylactic fungicide when applied to plants by the ULV-process; the composition may also be diluted with water into a sprayable aqueous emulsion.

EXAMPLE 25

Wettable powder

The powder composition was compounded from the following ingredients:

| | Parts |
|---|---|
| Product of Example 2 | 50 |
| Kaolin | 45 |
| Silicic acid | 2 |
| Sodium dioctyl sulfosuccinate | 2 |
| Sodium liguin sulfonate | 1 |

Preparation

The ingredients were intimately admixed with each other, and the mixture was milled into a fine powder, which was suspended in water to make the active ingredient concentration from 0.5 to 0.0001% by weight. The resulting sprayable aqueous suspension was an affective prophylactic fungicide when applied to plants.

EXAMPLE 26

Suspension powder

The powder composition was compounded from the following ingredients:

| | Parts |
|---|---|
| Product of Example 13 | 80 |
| Calcium liguin sulfonate | 8 |
| Colloidal silicic acid | 5 |
| Sodium sulfate | 5 |
| Liisobutyl naphthalene sodium sulfonate | 2 |

Preparation

The ingredients were intimately admixed with each other, and the mixture was milled into a fine powder, which was then suspended in a sufficient amount of water to make the active ingredient content of the aqueous suspension from 0.5 to 0.0001% by weight. The resulting sprayable suspension was an effective prophylactic fungicide when applied to plants.

EXAMPLE 27

Aerosol spray

The spray composition was compounded from the following ingredients:

| | Parts |
|---|---|
| Product of Example 4 | 0.05 |
| Sesame oil | 0.10 |
| N-methyl-pyrrolidone | 10.00 |
| Mixture of Frigen 11 and 12 | 89.85 |

Preparation

The active ingredient and the sesame oil were dissolved in the N-methyl-pyrrolidone, the solution was charged into an aerosol container, which was then pressurized with the Frigen propellant gas mixture. The resulting aerosol spray was an effective fungicide when applied to plants.

Analogous results were obtained when any one of the other compounds embraced by Formula I was substituted for the particular active ingredient in Examples 24 through 27. Likewise, the amount of active ingredient in these illustrative examples may be varied to achieve the concentration range set forth above, and the amounts and nature of the inert carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

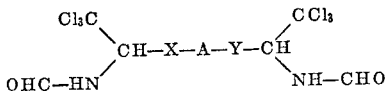

wherein X and Y are each oxygen, sulfur, —SO— or —SO$_2$—; and A is
 (a) straight or branched alkylene of 2 to 10 carbon atoms, alkylene of 2 to 10 carbon atoms whose carbon chain is interrupted by 1 to 3 oxygen atoms, by a sulfur atom, by —SO—, by —SO—, or by cyclohexylene,
or (b) cyclohexylene 2. A compound of the formula

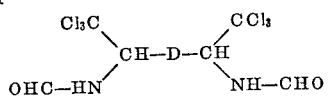

wherein D is —O—alkylene of 2 to 6 carbon atoms —O—,

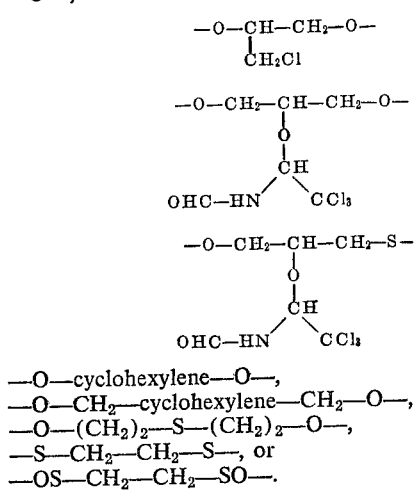

—O—cyclohexylene—O—,
—O—CH$_2$—cyclohexylene—CH$_2$—O—,
—O—(CH$_2$)$_2$—S—(CH$_2$)$_2$—O—,
—S—CH$_2$—CH$_2$—S—, or
—OS—CH$_2$—CH$_2$—SO—.

3. A compound according to claim 2, which is 1,2-bis-[(1'-formylamino-2',2',2'-trichloro)-ethoxy]-ethane.
4. A compound according to claim 2, which is 1,4-bis-[(1'-formylamino-2',2',2'-trichloro)-ethoxy]-n-butane.
5. A compound according to claim 2, which is 2,3-bis-[1'-formylamino-2',2',2'-trichloro)-ethoxy]-n-butane.
6. A compound according to claim 2, which is 1,3-bis-[(1'-formylamino-2',2',2'-trichloro)-ethoxy]-n-butane.
7. A compound according to claim 2, which is 1,3-bis-[(1'-formylamino-2',2',2'-trichloro)-ethoxy]-propane.
8. A compound according to claim 2, which is 1,2-bis-[(1'-formylamino-2',2',2'-trichloro)-ethoxy]-propane.
9. A compound according to claim 2, which is 2,3-bis-[(1'-formylamino - 2',2',2' - trichloro) - ethoxy] - 2,3-dimethyl-butane.
10. A compound according to claim 2, which is 1-[(1'-formylamino-2',2',2'-trichloro) - ethoxy] - 2 - [(1''-formylamino-2'',2'',2''-trichloro)-ethylmercapto]-ethane.
11. A compound according to claim 2, which is 1,2-bis-[(1'-formylamino-2',2',2'-trichloro)-ethoxy] - 1 - chloromethyl-ethane.
12. A compound according to claim 2, which is 1,2,3-tris-[(1' - formylamino - 2',2',2' - trichloro) - ethoxy]-propane.
13. A compound according to claim 2, which is 1,4-bis-[(1'-formylamino-2',2',2'-trichloro)-ethoxy] - cyclohexane.
14. A compound according to claim 2, which is 1,4-bis-[(1'-formylamino - 2',2',2' - trichloro) - ethoxymethyl]-cyclohexane.
15. A compound according to claim 2, which is 1,2-bis-[(1'-formylamino - 2',2',2' - trichloro) - ethoxy]-3-[(1''-formylamino-2'',2'',2''-trichloro) - ethylmercapto]-propane.
16. A compound according to claim 2, which is 1,5-bis-[(1'-formylamino-2',2',2'-trichloro) - ethoxy]-3-thia-n-pentane.
17. A compound according to claim 2, which is 1,2-bis-[(1'-formylamino-2',2',2' - trichloro) - ethoxy] - cyclohexane.
18. A compound according to claim 2, which is 1,3-bis-[(1'-formylamino-2',2',2'-trichloro) - ethoxy] - cyclohexane.
19. A compounud according to claim 2, which is 1,5-bis-[(1' - formylamino - 2',2',2' - trichloro) - ethoxy]-n-pentane.
20. A compound according to claim 2, which is 1,2-bis-[(1'-formylamino - 2',2',2'- - trichloro) - ethylthio]-ethane.
21. A compound according to claim 2, which is 1,2-bis-[(1'-formylamino-2',2',2'-trichloro) - ethylsulfoxido]-ethane.

References Cited
UNITED STATES PATENTS
2,425,392   8/1947   Robinson et al. ____ 260—404.5

LEWIS GOTTS, Primary Examiner
E. G. LOVE, Assistant Examiner

U.S. Cl. X.R.
260—561 R, 562 R; 424—320, 324

PO-1050
(5/69)

UNITED STATES PATENT OFFICE
CERTIFICATE OF CORRECTION

Patent No. 3,702,344                    Dated November 7, 1972

Inventor(s) WALTER OST, KLAUS THOMAS and DIETRICH JERCHEL

It is certified that error appears in the above-identified patent and that said Letters Patent are hereby corrected as shown below:

Col. 1, line 7 - Insert --Claims priority, application Austria, July 21, 1969, A-6998/69 --

Col. 9, line 17 - correct "-SO-" (second occurrence) to read -- $-SO_2-$ --;

"    "  line 26, insert -- $-O-CH_2-CH_2-S-$ --.

Signed and sealed this 10th day of July 1973.

(SEAL)
Attest:

EDWARD M. FLETCHER, JR.                Rene Tegtmeyer
Attesting Officer                       Acting Commissioner of Patents